United States Patent
Drese et al.

(10) Patent No.: US 9,278,352 B2
(45) Date of Patent: Mar. 8, 2016

(54) MICROFLUIDIC CHIP COMPRISING SEVERAL CYLINDER-PISTON ARRANGEMENTS

(75) Inventors: Klaus-Stefan Drese, Mainz (DE); Daniel Latta, Mainz (DE); Marion Ritzi-Lehnert, Langen (DE); Tina Roeser, Brohl (DE)

(73) Assignee: FRAUNHOFER-GESELLSCHAFT ZUR FORDERUNG DER ANGEWANDTEN FORSHUNG E.V., Munich (DE)

( * ) Notice: Subject to any disclaimer, the term of this patent is extended or adjusted under 35 U.S.C. 154(b) by 133 days.

(21) Appl. No.: 13/824,817

(22) PCT Filed: Sep. 27, 2011

(86) PCT No.: PCT/EP2011/004816
§ 371 (c)(1),
(2), (4) Date: Mar. 18, 2013

(87) PCT Pub. No.: WO2012/041479
PCT Pub. Date: Apr. 5, 2012

(65) Prior Publication Data
US 2013/0209328 A1   Aug. 15, 2013

(30) Foreign Application Priority Data
Sep. 30, 2010   (DE) .......................... 10 2010 041 833

(51) Int. Cl.
*B01L 3/00* (2006.01)
*B81B 3/00* (2006.01)
(Continued)

(52) U.S. Cl.
CPC ........... *B01L 3/50273* (2013.01); *B01L 3/5027* (2013.01); *F04B 19/006* (2013.01); *B01L 3/0217* (2013.01); *B01L 3/502707* (2013.01); *B01L 3/502738* (2013.01); *B01L 3/502746* (2013.01); *B01L 2200/0605* (2013.01); *B01L 2200/0689* (2013.01); *B01L 2300/0645* (2013.01); *B01L 2300/089* (2013.01); *B01L 2300/0838* (2013.01); *B01L 2300/0858* (2013.01);
(Continued)

(58) Field of Classification Search
CPC combination set(s) only.
See application file for complete search history.

(56) References Cited

U.S. PATENT DOCUMENTS 3,855,868 A    12/1974  Sudvaniemi
5,863,801 A  *  1/1999  Southgate et al. .............. 436/63
(Continued)

FOREIGN PATENT DOCUMENTS

WO    2005002729    1/2005
WO    2007125468   11/2007
WO    2008036045    3/2008

OTHER PUBLICATIONS

Ceyssens et al. Transducers Jun. 21-25, 2009, p. 889-892, "Large stroke high force pneumatic actuators frabricated by SU-8 micromachining."
(Continued)

*Primary Examiner* — Lyle Alexander
*Assistant Examiner* — Jennifer Wecker
(74) *Attorney, Agent, or Firm* — Brooks Kushman P.C.

(57) ABSTRACT

A microfluidic arrangement including a substrate in which a microfluidic structure having several adjacent channels and at least one common supply line, into which the adjacent channels merge, is formed. Each of the adjacent channels form the cylinder of a cylinder-piston arrangement for receiving an associated piston. A method for producing the type of microfluidic-arrangement is also disclosed.

20 Claims, 5 Drawing Sheets (51) Int. Cl.
  *F04B 19/00* (2006.01)
  *F15C 5/00* (2006.01)
  *F16K 99/00* (2006.01)
  *B01L 3/02* (2006.01)

(52) U.S. Cl.
  CPC . *B01L 2300/0861* (2013.01); *B01L 2300/0864* (2013.01); *B01L 2300/0883* (2013.01); *B01L 2400/0478* (2013.01); *F16K 99/0001* (2013.01); *F16K 2099/0084* (2013.01)

(56) References Cited

U.S. PATENT DOCUMENTS

| | | | |
|---|---|---|---|
| 7,438,857 B2 | 10/2008 | Massaro | |
| 7,892,493 B2 | 2/2011 | Weekamp | |
| 8,127,794 B2 | 3/2012 | Xie et al. | |
| 2002/0185184 A1* | 12/2002 | O'Connor et al. | 137/822 |
| 2003/0057391 A1* | 3/2003 | Krulevitch et al. | 251/11 |
| 2003/0099577 A1* | 5/2003 | Renaud et al. | 422/100 |
| 2004/0146433 A1* | 7/2004 | Massaro | 422/100 |
| 2005/0106752 A1* | 5/2005 | Yu et al. | 436/174 |
| 2006/0008370 A1* | 1/2006 | Massaro et al. | 417/539 |
| 2006/0159564 A1 | 7/2006 | Wu et al. | |
| 2006/0222569 A1* | 10/2006 | Barten et al. | 422/100 |
| 2007/0099290 A1* | 5/2007 | Iida et al. | 435/287.2 |
| 2008/0102235 A1* | 5/2008 | Skigen et al. | 428/35.7 |
| 2009/0095057 A1 | 4/2009 | Staats | |
| 2009/0130766 A1* | 5/2009 | Weekamp | 436/63 |

OTHER PUBLICATIONS

De Volder et al. J. Micromech. Microeng. 2010, vol. 20, 19 Pages, "Pneumatic and hydraulic microactuators: a review,".
International Search Report for PCT/EP2011/004816, English translation attached to original, Both completed by the European Patent Office on Feb. 13, 2012, All together 7 Pages.

* cited by examiner

MICROFLUIDIC CHIP COMPRISING SEVERAL CYLINDER-PISTON ARRANGEMENTS

CROSS-REFERENCE TO RELATED APPLICATION

This application is the U.S. national phase of PCT Application No. PCT/EP2011/004816 filed on 27 Sep. 2011, which claims priority to German Patent Application No. 10 2010 041 833.1 filed on 30 Sep. 2010, the disclosures of which are incorporated in their entirety by reference herein.

The invention relates to a microfluidic arrangement having a substrate, particularly in the form of one or more microfluidic chips, also referred to as a lap-on-a-chip system, in which a microfluidic structure is formed for carrying out chemical, biological, biochemical and/or medical analysis and/or detection methods (in short: tests), for example immunoassays, DNA assays or the like. A sample to be studied in such a microfluidic arrangement is distributed via a central supply line over a plurality of separate reaction chambers or detection regions, in which for example various reaction components for the sample to be analyzed are immobilized or introduced or introducible in another way. The invention furthermore relates to a method for producing a corresponding microfluidic arrangement.

Microfluidics is distinguished by a controlled movement of extremely small sample volumes in the microliter or nanoliter range. Exact control of reactions in microchannels or microchambers inside the microfluidic chip is therefore possible. The microfluidic control represents a great challenge, in particular because, owing to the very small dimensions of the channels and chambers, surface effects play a very dominant role and make reproducible processes inside the microfluidic arrangement more difficult. This problem becomes significant in particular during the active filling of a plurality of channels or chambers of the same type, when identical test conditions are intended to be provided for a sizeable number of samples, i.e. in particular the plurality of channels are all intended to be filled with the same sample volumes. Furthermore, in a similar way to high-throughput screening, the plurality of channels are filled synchronously in order to be able to carry out tests synchronously in all the channels without loss of time. To date, there is no actuator system known from the field of microfluidic arrangements which satisfies the requirements explained above.

It is therefore an object of the present invention to provide a microfluidic arrangement with which a plurality of adjacent channels can be filled synchronously and with a high volumetric accuracy for the purpose of sample analysis. It is furthermore an object of the invention to provide a method for producing such a microfluidic arrangement.

The invention is achieved by a microfluidic arrangement having the features of patent claim 1 and by a method as claimed in patent claim 13.

The microfluidic arrangement according to the invention comprises a substrate in which a microfluidic structure is formed, the latter having a plurality of adjacent channels and at least one common supply line, into which the adjacent channels open, each of the adjacent channels forming the cylinder of a cylinder/piston arrangement for receiving an associated piston.

The principle of active filling of the adjacent channels, or reaction channels, is similar to that of a multipipette, as is known for example from the U.S. Pat. No. 3,855,868, this principle being applied according to the invention to the field of microfluidics, in particular of lap-on-a-chip systems. A particular difference from the known multipipettes is that the cylinder is formed as an integral component of the substrate of the microfluidic arrangement, i.e. for example of the chip or chips. Such a substrate has, as is known, a flat planar configuration, similar to the format of a check card, with planar upper and lower sides and a plurality of, typically four, narrow end surfaces along the edge. The channels typically extend as grooves on the upper and/or lower side or as bores in the plane, the grooves being sealed from the environment by a cover in the form of a film. Furthermore, filling or outlet or connecting bores communicating with the channels may be provided perpendicularly to the plane in the substrate.

Each of the adjacent channels is assigned a piston. The pistons may for example be configured in the form of wires, which are preferably introduced laterally into the cylinders through apertures in one or more of the end surfaces of the substrate and arranged movably forward and backward along the longitudinal axis in the cylinders.

The invention is advantageously refined in that a sealing arrangement, which is stationary relative to the microfluidic structure, is provided for sealing the piston in the cylinder.

Unlike cylinder/piston arrangements in which a seal element is usually provided at the front end of the piston, the sealing arrangement according to the invention is not moved together with the piston, but rather the piston moves relative to the sealing arrangement. In an ideal configuration, this has the advantage that no contact takes place between the piston and the cylinder wall. Any functionalization of the channel surface in the cylinder region, for example by immobilization of a reaction component, is thereby not compromised during the to-and-fro movement of the piston.

Preferably, the sealing arrangement comprises a continuous seal element which spans the plurality of adjacent channels on the piston side.

Such a central seal element for sealing all the adjacent cylinder/piston arrangements makes it possible, for the first time, for the sealing arrangement to be arranged stationary with respect to the microfluidic structure and rather than with respect to the piston.

The continuous central seal element is above all easier to produce in terms of production technology than individual seal elements for each of the adjacent cylinder/piston arrangements.

Preferably, the sealing arrangement comprises a sealing channel, which crosses the plurality of adjacent channels, for receiving the continuous seal element.

In this channel, the sealing element may for example be introduced in the form of a highly viscous fluid (for example grease) or in the form of an elastomer (rubber, silicone) or, in general, as a polymeric plastic.

As an alternative configuration of the invention, the seal element is applied on the end side of the substrate of the microfluidic arrangement.

Particularly preferably, the seal element is connected to the substrate of the microfluidic arrangement by injection molding. This relates both to the configuration with a seal element applied in the sealing channel and to the configuration with a seal element applied on the end side.

The substrate of the microfluidic arrangement is itself preferably also produced by injection molding. In this case, the seal element is particularly preferably introduced or applied by a two-component injection molding method.

The advantage resides in economical production and a high manufacturing accuracy inherent to the production method.

Particularly preferably, according to the method for producing a microfluidic arrangement of the type described above, the microfluidic arrangement is produced by the injection molding method, the pistons being placed in an injection mold and at least one plastic being injected around them.

If the microfluidic arrangement per se is produced by injection molding, then preferably all the microfluidic structures on the substrate are already a component of the injection-molded part, so that mechanical finishing can be substantially obviated. The pistons are placed in the injection mold either after the injection molding of the substrate or with the completed substrate, and the polymer/elastomer of the seal element is then injected around them.

Alternatively, they are first placed in the mold and then initially the substrate material of the microfluidic arrangement is injected around them, and subsequently the polymer/elastomer of the seal element is injected around them. What is crucial in this case is respectively the choice of material, in order to achieve the desired sealing and sufficient mobility of the pistons.

Preferably, the plurality of pistons assigned to the adjacent channels are coupled to one another by a common actuation element.

By virtue of such a common actuation element, all the pistons can be synchronously moved by a common drive or manually. This drive principle is known from the use of multipipettes.

The common supply line has a sufficient volume before the openings of all the adjacent channels in the flow direction, which ensures that all the adjacent channels can be filled simultaneously and uniformly.

The common supply line is preferably formed by a channel which extends transversely with respect to the adjacent channels and has two accesses, at least one of which can particularly preferably be sealed in a gas-tight fashion.

Other objects, features and advantages of the invention will be explained in more detail below with reference to exemplary embodiments with the aid of the drawings, in which.

Figure 1:
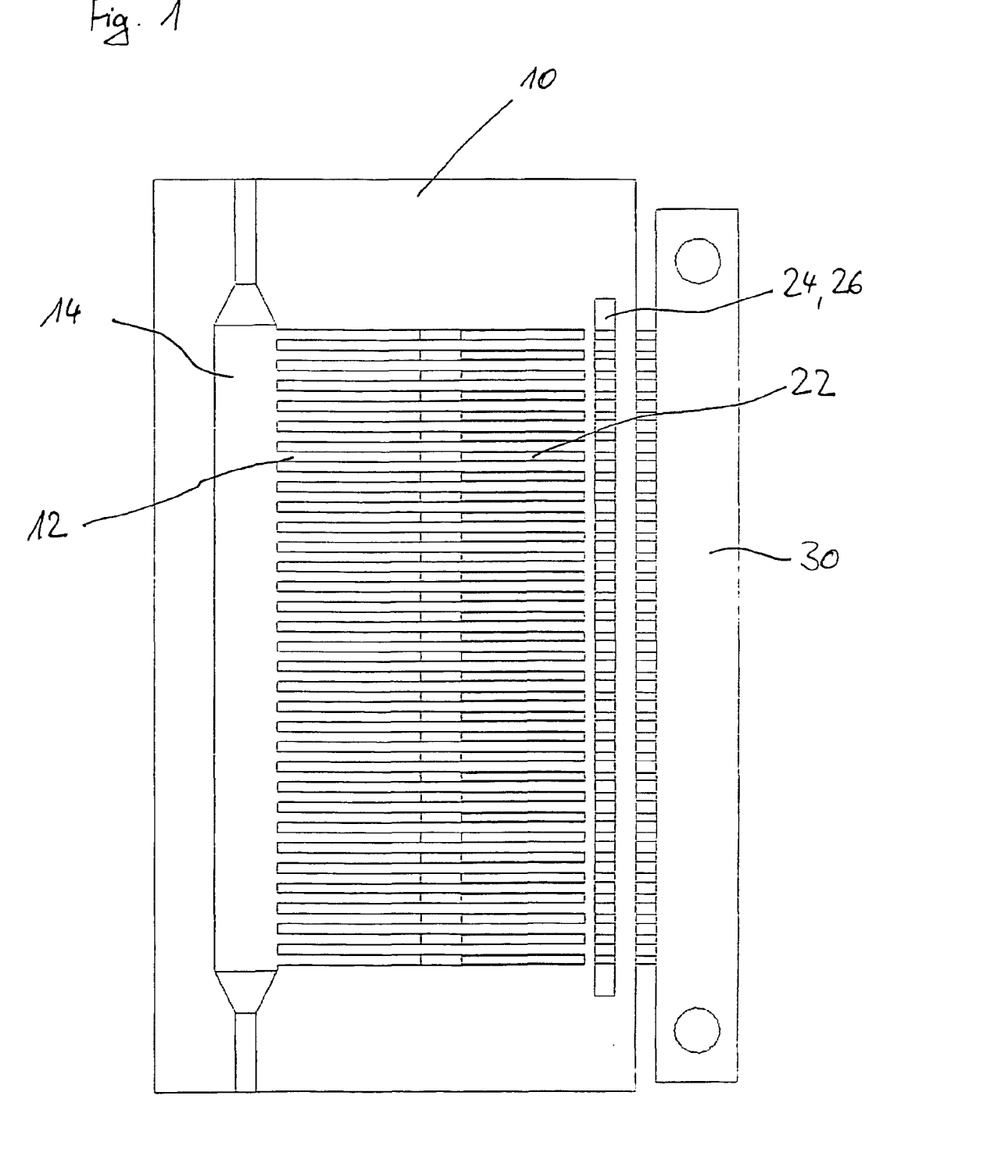
FIG. 1 shows a plan view of a first embodiment of the microfluidic arrangement.
Figure 2:
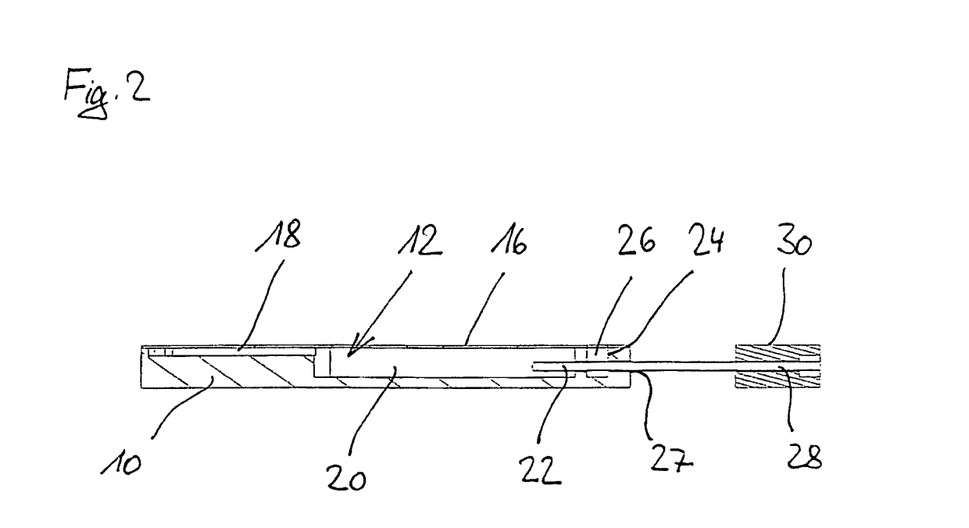
FIG. 2 shows a sectional side view of the first embodiment of the microfluidic arrangement according to FIG. 1.

FIGS. 1 and 2 schematically represent a first embodiment of the microfluidic arrangement according to the invention. The microfluidic arrangement is located on a single microfluidic chip. The latter comprises a substrate 10 in which a plurality of adjacent channels 12 and a common supply line 14, into which the adjacent channels 12 open, are formed. The plurality of adjacent channels 12 are incorporated in the form of parallel grooves, and the common supply line 14 is incorporated as a wider groove, extending perpendicularly thereto at the ends of the parallel channels 12 on their opening side, on an upper side of the substrate 10. The upper side of the substrate is sealed from the environment by a cover film 16, so that channels closed circumferentially on all sides are formed from the grooves.

The parallel channels 12 have a flat section 18, which is provided for the reaction or detection of the fluid to be tested, referred to hereinbelow as the functional section. The flat functional section 18 is followed by an abruptly deeper section 20, which forms the cylinder of a cylinder/piston arrangement, referred to hereinbelow as the cylinder section. An associated piston 22 is received in each of the cylinders formed in this way. The piston 22 displaces a defined volume inside the cylinder section 20 and can be moved forward and backward parallel to its longitudinal axis, which ideally coincides with the longitudinal axis of the channel 12, in the cylinder section 20, so that the displaced volume can be increased or reduced.

Figure 3:
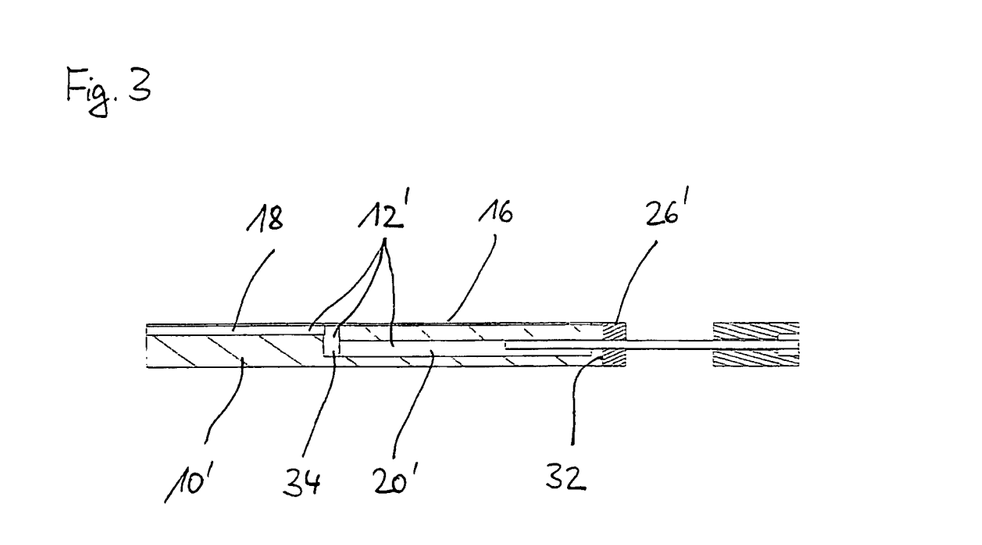
FIG. 3 shows a sectional side view of a second embodiment of the microfluidic arrangement according to the invention.

In the substrate 10, a sealing channel 24 crossing the plurality of adjacent channels 12 on the piston side, i.e. on the opposite side from the supply line 14, is furthermore formed in the substrate 10 from the upper side. In the context of this document, an arrangement in which, as shown in FIG. 1, the channels 12, or respectively their cylinder sections 20, and the sealing channel 24 do not cross directly but extend transversely with respect to one another at a distance, is also referred to as crossing. The sealing channel 24 receives a continuous seal element 26 which extends fully over the width of all the parallel channels 12. The pistons 22 are introduced into the cylinder sections 20 of the parallel channels 12 through apertures 27 on the end side. So that the channels 12 are not connected to the external environment by these apertures 27, the seal element is arranged at this position—or a different position as shown in FIG. 3—but at least on the piston side. The seal element accordingly likewise comprises passage apertures for the pistons, but bears on these preferably elastically with radial pressure. The seal element therefore preferably consists of an elastomer, and is particularly preferably connected to the substrate 10 by injection molding.

The plurality of pistons 22 assigned to the adjacent channels 12 are guided into the apertures 27 through the substrate 10 and the seal element 26, parallel to the cylinder sections 20. The pistons 22 are coupled to one another at their ends 28 protruding from the substrate 10 by a common actuation element 30, in such a way that they can only be retracted from the associated cylinders, or inserted therein, synchronously and in parallel. In this way, it is ensured that—assuming identical profiles of the pistons—the change in the volume displaced inside the cylinder sections 20 is of equal size in all the adjacent channels 12, so that an equal reduced or positive pressure is simultaneously formed in the channels 12. This ensures that the fluid to be studied flows uniformly from the common supply line 14 into the functional sections 18 of the parallel channels 12, or vice versa, and the same fluid volume is finally moved in all the parallel channels 12. This allows filling of the plurality of adjacent channels 12, and therefore the test in the microfluidic arrangement, with great process reliability despite the surface effects mentioned in the introduction, since the pressure change takes place synchronously and is equally large in all the channels, although the channels 12 communicate with one another only through the supply line 14 and are separated from one another on the piston side (or filling suction side).

Although it is preferred for parallel tests under the same conditions, it is not essential to the invention for the adjacent channels 12 or the associated pistons 22, as represented in FIG. 1 and FIG. 2, to have identical dimensions. In principle, it is also conceivable for larger or smaller volumes of the fluid to be moved in selected channels with an equal piston excursion, for example by the piston cross section being correspondingly varied. This may, for example, be desirable when different detection reactions with markers of different sensitivity are carried out simultaneously in a device of the type according to the invention, so that different amounts of fluid are required.

The adjacent channels are, as represented in FIG. 1, preferably arranged essentially parallel so that the common actuation of the pistons can take place in a straightforward way, with high precision and with little force being exerted. In practice, a non-parallel arrangement of the channels would not actually be ruled out. However, this requires for example flexible pistons or a flexible common actuation element, which could compromise the sealing and/or the precision of the volume change, and is therefore not to be preferred without a particular reason.

The exemplary embodiment of the microfluidic arrangement according to the invention as represented in FIG. 3 differs from the one according to FIG. 2 by adjacent channels 12' which are configured in terms of their cylinder section 20' in the form of a bore, and are continued by means of a transverse bore 34 perpendicularly to the plane of the substrate 10' into the otherwise identical functional sections 18, which then open into the common supply line 14 in the manner shown in FIG. 1.

The pistons 22 almost fully fill the space of the cylindrical cylinder sections 20', which are small in comparison with the example of FIG. 2, so that when the pistons 22 are retracted, a larger relative volume change of the channels 12' takes place. The result is that a greater pressure change, or with the same actuation speed when retracting the pistons 22 a more rapid pressure drop, acts on the fluid present in the common supply line, which is consequently sucked into the functional channel 18 more rapidly.

Another difference is that the embodiment according to FIG. 3 has a continuous seal element 26' which spans the plurality of adjacent channels 12' on the piston side and is applied on the end side of the substrate 10'. This seal element also preferably consists of an elastomer, which is connected to the end surface 32 of the substrate 10' by injection molding.

Figure 4:
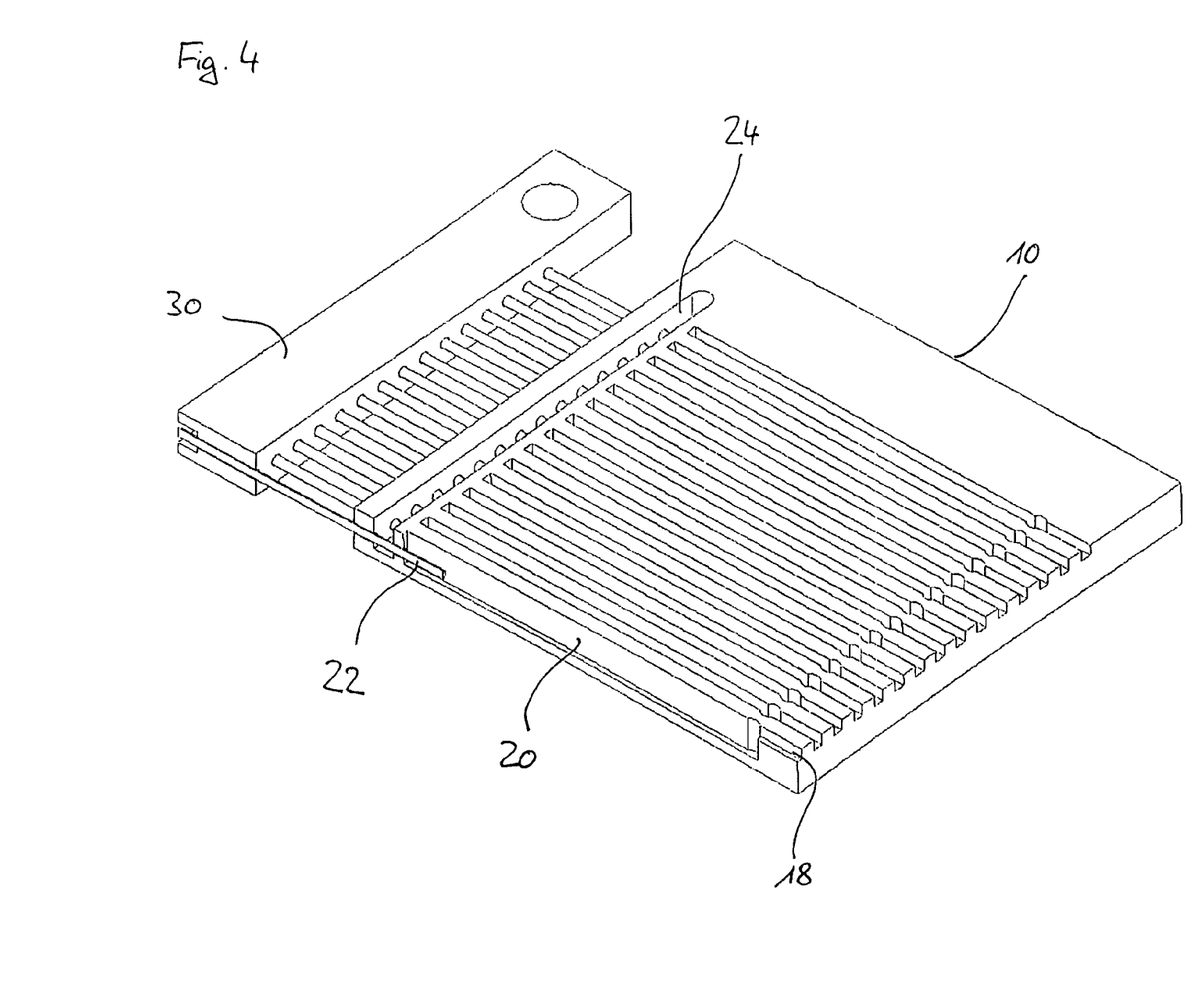
FIG. 4 shows a perspective detail enlargement in partial section of the microfluidic arrangement according to the invention.

FIG. 4 shows an enlarged perspective detail of an embodiment of the microfluidic arrangement according to the invention which is similar to that according to FIGS. 1 and 2. FIG. 4 reveals that the piston 22 has a significantly smaller cross section than the associated cylinder section 20, and displacement of the piston therefore entails a smaller relative volume change, and therefore pressure change, than in the exemplary case of FIG. 3. This teaches that the desired pressure change can be adjusted by corresponding design measures for a particular speed of the forward displacement of the piston.

It can furthermore be seen in FIG. 4 that the piston has a cylindrical geometry. Preferably, the piston 22 is formed from a straight piece of wire. At this point, it should be mentioned that the structures shown here have dimensions in the millimeter range or in the submillimeter range. The cylindrical geometry of pistons in wire form therefore represents the piston embodiment which is simplest to produce.

It can also be seen in the representation of FIG. 4 that the cylinder section 20 not only has a larger cross section than the piston but also has a different cross-sectional shape, namely a rectangular shape. In this sense, when the term cylinder is used in the present document, it means the function of the corresponding channel or channel section as part of a cylinder/piston arrangement, and not for instance a channel/channel section having a strict cylinder geometry, i.e. a round base surface.

Lastly, it can be seen clearly in FIG. 4 that, owing to its smaller cross section which is essentially constant over its entire length, the piston 22 does not touch the wall of the cylinder section 20, so that a mechanical effect on a reactive substance, for example one applied onto the inner surface of the cylinder wall 20, is avoided. This, of course, presupposes a sufficient processing precision in terms of parallelism of the cylinder section and the piston, or piston guiding.

Figure 5:
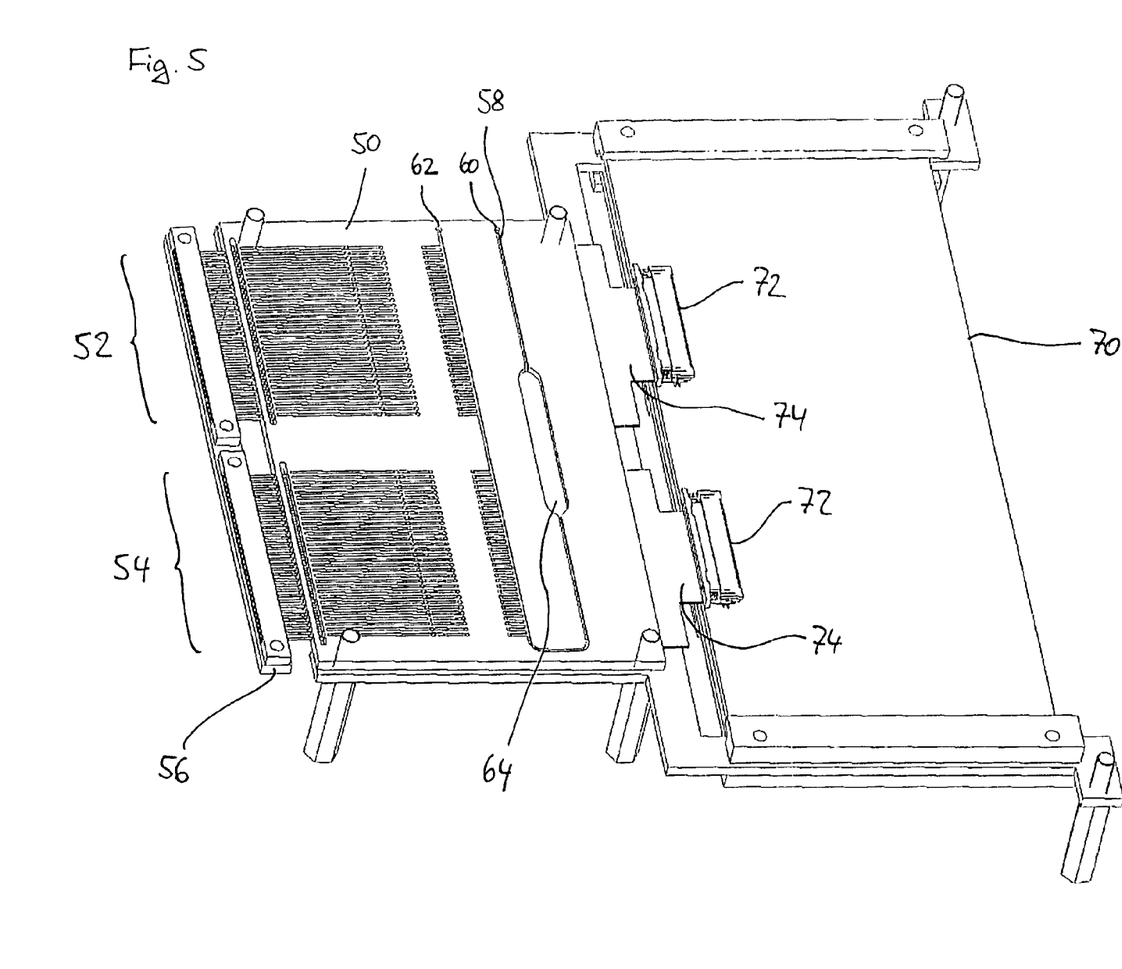
FIG. 5 shows a third embodiment of the microfluidic arrangement with a detection module in perspective representation.

The exemplary embodiment of the microfluidic arrangement according to the invention according to FIG. 5 differs from those described above in particular by its more complex configuration. Similarly as in the examples described above, the arrangement is formed on a chip providing the substrate 50. In this embodiment, however, two blocks 52, 54 are formed in the substrate, each having 32 parallel adjacent channels which respectively form the cylinder of a cylinder/piston arrangement and which are respectively assigned a piston. All sixty-four pistons of the two blocks are coupled to one another by a common actuation element 56 in such a way that they can only be retracted from their cylinders, or inserted, together and in parallel.

The common supply line 58 in this exemplary embodiment comprises two accesses, namely a feed 60 and a discharge 62. Behind the feed 60 in the flow direction, there is a reservoir 64 for receiving a sizeable amount of the fluid to be tested, which is sufficient in order to fill the functional sections of all 64 parallel channels. Behind the reservoir 64 in the flow direction, the adjacent channels open successively into the supply line 58. At this position, the supply line has a sufficiently large cross-sectional area in order to be able to fill all the parallel channels simultaneously and uniformly when retracting the pistons with the required speed.

The filling in this case takes place as follows: the fluid is first introduced into the common supply line and the reservoir 64 is thereby filled. Once this has been done, an access of the supply line, here the discharge 62, is sealed in a gas-tight fashion. Subsequently, the pistons are retracted by means of the common actuation element, for example by using a linear drive, from the cylinder sections of the parallel channels so that a reduced pressure is formed in all the channels hitherto filled with air or gas. Owing to the reduced pressure, the fluid flows from the common supply line, and in particular from the reservoir 64, into the parallel channels until pressure equilibration has taken place. With suitable dimensioning of the pistons, the functional sections of the parallel channels and the piston excursion, this is then achieved when the functional sections have been filled to the desired extent. After the parallel channels have been filled, the sealed discharge 62 of the common supply line 58 is opened again and the remaining fluid is withdrawn from the common supply line and the reservoir 64 by applying a pressure difference between the feed and discharge, so that there is no longer any liquid bridge between the individual liquid plugs now present in the parallel channels. In this way, cross-contamination between the individual liquid plugs in the adjacent channels is prevented. The emptying of the parallel channels may be carried out in the reverse direction by returning the pistons into the cylinder sections, so that a positive pressure which displaces the fluid sample into the common supply line is set up. This is preferably done with one access sealed, in order to impart a desired transport direction to the fluid.

In the right-hand half of FIG. 5, an electronic detection unit 70, to which for example two foil electrodes 74 as part of an electrochemical sensor system are connected by means of two jack connections 72, is represented by way of example.

Figure 6:
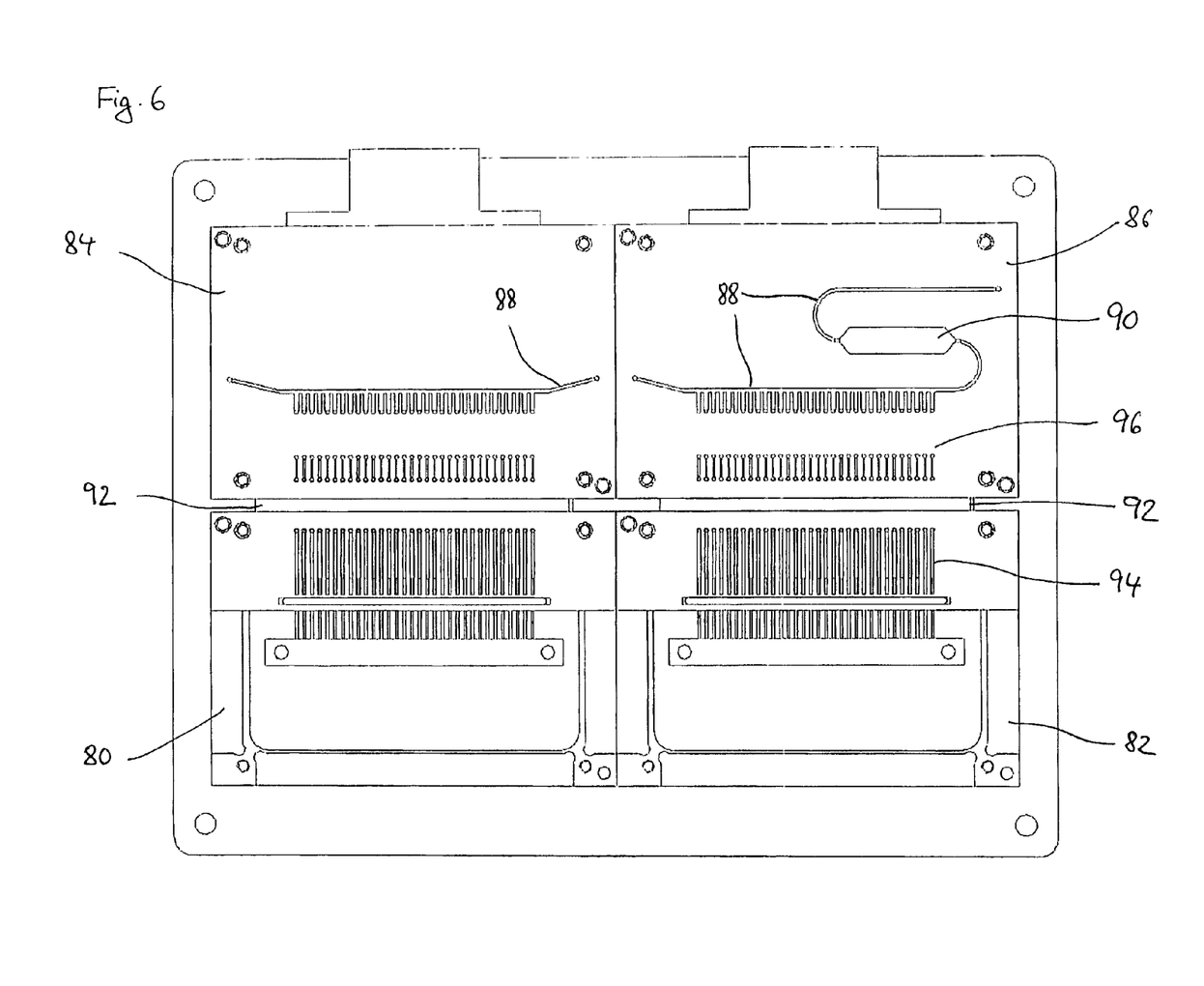
FIG. 6 shows a plan view of a fourth embodiment of the microfluidic arrangement distributed over four microfluidic chips.

FIG. 6 represents another exemplary embodiment of the microfluidic arrangement according to the invention, which, in a similar way to the arrangement of FIG. 5, comprises two blocks of parallel adjacent channels and associated pistons. An essential difference of this arrangement is that it extends over a total of four microfluidic chips, which provide a common substrate. For example, the two chips 80, 82 represented underneath respectively comprise one block of the cylinder/piston arrangements and the upper two chips 84, 86 each comprise a section of the common supply line 88, a reservoir 90 for the fluid sample only being integrated therein in the chip 86. With such a microfluidic arrangement, additional connecting channels 92 (not represented in detail) are required for connecting the cylinder sections 94 of the parallel channels on the chips 80, 82 to the respectively assigned functional sections 96 of the parallel channels on the chips 84 and 86. Likewise, a connecting channel (not represented) is needed in order to bridge the common supply line 88 from the chip 84 to the chip 86.

LIST OF REFERENCES

- 10, 10' substrate
- 12, 12' parallel adjacent channels
- 14 common supply line
- 16 cover, film
- 18 reaction/detection or, in general, functional section
- 20, 20' cylinder section
- 22 piston
- 24 sealing channel
- 26, 26' seal element
- 28 outer-lying piston end
- 30 common actuation element
- 32 end side of the substrate
- 50 substrate
- 52, 54 blocks of adjacent parallel channels
- 56 common actuation element
- 58 common supply line
- 60 access, feed
- 62 access, discharge
- 64 reservoir
- 70 electronics module
- 72 jack connection
- 74 electrode
- 80, 82 microfluidic chip
- 84, 86 microfluidic chip
- 88 common supply line
- 90 reservoir
- 92 connecting channels
- 94 cylinder section
- 96 reaction/detection or, in general, functional section

The invention claimed is:

1. A microfluidic arrangement comprising:
    a substrate in which a microfluidic structure is formed, the latter having a plurality of parallel adjacent channels each having an open top side, and at least one common supply line, into which one end of the adjacent channels open, wherein a portion of each of the adjacent channels forms a cylinder section of a cylinder/piston arrangement, with the other end of the adjacent channels forming an aperture sized to receive a piston;
    a plurality of elongate pistons each associated with one of the plurality of channels and having a cross sectional area significantly less than the associated channel, wherein the pistons each have a free end which extends through the aperture into the cylinder section of one of the channels;
    a cover cooperating with the top side of the substrate and configured to sealingly isolate the parallel adjacent channels from the outside environment;
    and a sealing arrangement, which is stationary relative to the substrate, for sealing each of the pistons in an associated cylinder adjacent a second end of the channel;
    wherein the pistons are configured to move axially through the sealing arrangement, enabling the free end to move into or out of the cylinder section; and
    wherein the sealing arrangement comprises a continuous seal element which spans the plurality of adjacent channels and seals a plurality of the pistons.

2. The microfluidic arrangement as claimed in claim 1, wherein the sealing arrangement comprises a sealing channel, which crosses the plurality of adjacent channels, for receiving the continuous seal element.

3. The microfluidic arrangement as claimed in claim 1, wherein the seal element is applied on an end side of the substrate of the microfluidic arrangement.

4. The microfluidic arrangement as claimed in claim 2, wherein the seal element consists of a polymer.

5. The microfluidic arrangement as claimed in claim 4, wherein the seal element is connected to the substrate of the microfluidic arrangement by injection molding.

6. The microfluidic arrangement as claimed in claim 1, further comprising a common actuation element wherein a plurality of pistons each assigned to one of the adjacent channels are coupled to one another by the common actuation element to enable the coupled pistons to be move in unison.

7. The microfluidic arrangement as claimed in claim 1, wherein the pistons are introduced into the substrate of the microfluidic arrangement through apertures on the substrate adjacent a second end of the channel.

8. The microfluidic arrangement as claimed in claim 6, wherein the common supply line has a sufficient volume to ensure that all the adjacent channels can be filled simultaneously and uniformly when the common actuating element is moved withdrawing the pistons in unison.

9. The microfluidic arrangement as claimed in claim 1, wherein the common supply line is formed by a channel which extends transversely on the top side of the substrate with respect to the adjacent channels and has two access ports.

10. The microfluidic arrangement as claimed in claim 9, wherein at least one of the access ports can be sealed in a gas-tight fashion.

11. A method for producing a microfluidic arrangement as claimed in claim 1, wherein the microfluidic arrangement is produced by an injection molding method, the pistons being placed in an injection mold and at least one plastic being injected around them.

12. The method as claimed in claim 11, wherein the pistons are placed in the injection mold after the injection molding of the substrate or with the completed substrate, and a polymer seal element is then injected around them.

13. The microfluidic arrangement as claimed in claim 1, wherein the cover comprises a film layer.

14. A microfluidic arrangement comprising:
    a substrate in which a microfluidic structure is formed, the latter having a plurality of parallel adjacent channels each having an open top side, and at least one common supply line, into which one end of the adjacent channels open, wherein a portion of each of the adjacent channels forms a cylinder section of a cylinder/piston arrangement, with the other end of the adjacent channels forming an aperture sized to receive a piston;
    a plurality of elongate pistons each associated with one of the plurality of channels and having a cross sectional area significantly less than the associated channel, wherein the pistons each have a free end which extends through the aperture into the cylinder section of one of the channels;

a cover cooperating with the top side of the substrate and configured to sealingly isolate the parallel adjacent channels from the outside environment; and a sealing arrangement, which is stationary relative to the substrate, for sealing each of the pistons in an associated cylinder adjacent a second end of the channel;

wherein the pistons are configured to move axially through the sealing arrangement, enabling the free end to move into or out of the cylinder section; and wherein each of the adjacent channels further comprise an open top functional channel section located between the cylinder channel section and the supply line, wherein the functional channel section has a significantly smaller cross sectional area than the cylinder channel section.

15. The microfluidic arrangement as claimed in claim 1, wherein the plurality of elongate pistons each has a common uniform diameter.

16. The microfluidic arrangement as claimed in claim 1, wherein the diameter of the pistons is in the range of a millimeter or less.

17. The microfluidic arrangement as claimed in claim 1, wherein the pistons each have a free end which an end which outwardly extends from a side of the substrate.

18. The microfluidic arrangement as claimed in claim 1, wherein the pistons each have a round cylindrical wire-like shape sized to freely move within the channel section without touching the side walls.

19. The microfluidic arrangement as claimed in claim 14, wherein the sealing arrangement comprises a continuous seal element which spans the plurality of adjacent channels and seals a plurality of pistons.

20. The microfluidic arrangement as claimed in claim 14, wherein the pistons each have a round cylindrical wire-like shape sized to freely move within the channel section without touching the cylinder side walls.

* * * * *